(12) United States Patent
Sahasi et al.

(10) Patent No.: US 8,706,812 B2
(45) Date of Patent: Apr. 22, 2014

(54) COMMUNICATION CONSOLE WITH COMPONENT AGGREGATION

(75) Inventors: Jayesh Sahasi, Fremont, CA (US); Brent Rojas, San Francisco, CA (US)

(73) Assignee: ON24, Inc., San Francisco, CA (US)

( * ) Notice: Subject to any disclaimer, the term of this patent is extended or adjusted under 35 U.S.C. 154(b) by 173 days.

(21) Appl. No.: 12/755,849

(22) Filed: Apr. 7, 2010

(65) Prior Publication Data
US 2011/0252094 A1 Oct. 13, 2011

(51) Int. Cl.
*G06F 15/16* (2006.01)

(52) U.S. Cl.
USPC ........... 709/205; 709/203; 709/224; 709/213; 709/231; 715/751; 715/205; 715/730; 715/753

(58) Field of Classification Search
USPC ................. 709/203, 204, 205, 217, 219, 225; 715/239, 240, 751
See application file for complete search history.

(56) References Cited

U.S. PATENT DOCUMENTS

| | | | | |
|---|---|---|---|---|
| 6,108,645 | A * | 8/2000 | Eichstaedt et al. | 707/741 |
| 6,141,595 | A * | 10/2000 | Gloudeman et al. | 700/83 |
| 6,636,888 | B1 * | 10/2003 | Bookspan et al. | 709/203 |
| 2002/0078150 | A1 * | 6/2002 | Thompson et al. | 709/204 |
| 2002/0085029 | A1 * | 7/2002 | Ghani | 345/751 |
| 2002/0143901 | A1 * | 10/2002 | Lupo et al. | 709/219 |
| 2003/0014521 | A1 * | 1/2003 | Elson et al. | 709/225 |
| 2003/0061330 | A1 * | 3/2003 | Frisco et al. | 709/223 |
| 2004/0103150 | A1 * | 5/2004 | Ogdon et al. | 709/205 |
| 2004/0187140 | A1 * | 9/2004 | Aigner et al. | 719/328 |
| 2007/0038931 | A1 * | 2/2007 | Allaire et al. | 715/526 |
| 2007/0192613 | A1 * | 8/2007 | Amoroso et al. | 713/179 |
| 2010/0023849 | A1 | 1/2010 | Hakim et al. | |

OTHER PUBLICATIONS

"An Automated Distributed Meeting Scheduler"—Sandip Sen, PSU, Apr. 2007 http://citeseerx.ist.psu.edu/viewdoc/download?doi=10.1.1.56.6862&rep=rep1&type=pdf.*
PCT/US2011/031513 International Search Report dated Jun. 8, 2011.
PCT/US2011/031513 Written Opinion dated Jun. 8, 2011.

* cited by examiner

*Primary Examiner* — Randy Scott
(74) *Attorney, Agent, or Firm* — DLA Piper LLP (US)

(57) ABSTRACT

Systems methods and devices are provided for a presentation including a communications console with component aggregation. In one potential implementation, a computing device with an application framework receives a communication manager object via a network connectivity device and executes the communication manager object within the application framework. The computing device may then receive and execute communications components and a presentation components within the application framework using the communication manager object. The communication manager object may then manages interface and display of the presentation information via the application framework, as modified by communication components.

6 Claims, 8 Drawing Sheets

FIG. 3a

TWITTER

| CONFIGURATION | STYLE | LANGUAGE | PREVIEW |

- TWITTER ACCOUNT NAME: SNEAKBROADCASTING
- TARGET WINDOW SITE: 320 HEIGHT / 200 WIDTH
- TWITTER LOGO: STANDARD TWITTER LOGO
- CLIENT LOGO: LORAINPSN LOGO.JPG
- EXTERNAL CSS URL: HTTP://WWW.USA24.COM/PRESS/SPONSORS/CSS.HTM
- TWEET PREFIX TAG: #LIG24BROADCASTING
- ENABLE REPLY ☑
- ENABLE RETWEET ☑
- ENABLE FAILURE ALERTS ☑
- ENABLE TAG CLOUD VIEW ☑
- TAG CLOUD EXCLUDE LIST
- TWEET VIEW
- WIDGET ENVIRONMENT: VERTICAL
- NAME TITLE: VIRTUAL SHOW
- ENABLE CLOSE BUTTON: LORAIN PSN/IR COLOR VIRTUAL SHOW 2010
- ALLOW DROP & DRAG ☑

[SAVE] [CANCEL]

FIG. 3b

TWITTER

| CONFIGURATION | STYLE | LANGUAGE | PREVIEW |

- WIDGET ENVIRONMENT: VIRTUAL SHOW
- WIDGET COLOR
- TWEET TEXT STYLE: VERDANA / 10 / B I U
- LINK STYLE: VERDANA / 10 / B I U
- BUTTON STYLE
- BORDER WIDTH: 1
- BORDER COLOR
- BUTTON COLOR
- BUTTON HIGHLIGHT COLOR
- TEXT STYLE: VERDANA / 10 / B I U
- HIGHLIGHT TEXT STYLE: VERDANA / 10 / B I U

[SAVE] [CANCEL]

COMMUNICATION CONSOLE WITH COMPONENT AGGREGATION

FIELD OF THE INVENTION

The present invention relates to online communications applications.

BACKGROUND OF THE INVENTION

Currently, numerous structures exist for direct online communications. The current solutions for providing interactivity and user control, however, are limited in the amount of user control that they provide for an audience member. These online communications applications limit flexibility, integration, and user selections in a variety of ways in order to streamline and limit the size and complexity of the application.

For example, current direct online applications limit flexibility by restricting the amount of customization that can be achieved within an individual communications component. None of the existing direct online platforms use a completely separate, encapsulated architecture for implementing communications component customization per webcast, and none of them allow an audience member to set up and view a webcast per their own interests. They also limit integration by restricting the amount of interactivity provided to a highly-customized communications. For example, existing webcasting platforms do not have an open platform for integrating third-party communications components of any significant size or complexity. The integration of third-party communications components in communication applications are limited in direct communications to simple image or animation components. Attempts to expand flexibility in current solutions involve creation of a collection of closed "widgets" which become the non-expandable limitations of the application.

Downloaded executable installed applications do exist currently that use a component model, but the requirement to download, execute, and install a desktop executable application in a client computer make the current use of these indirect executable applications less secure and more cumbersome from an initial use perspective. None of the existing applications function in a context that is fully-online, without a downloaded desktop application.

SUMMARY

In one potential implementation, flexibility of the application is increased by using completely separate, encapsulated architecture for implementing communications component customization per webcast, and none of them allow an audience member to set up and view a webcast per their own interests.

In another potential implementation, integration is increased by using an open platform for integrating third-party communications components of any significant size or complexity.

Another potential implementation targets each communications component in the direct application as being a fully self contained piece of the whole system, relying on the platform to provide common services, but able to function independently if needed. So not only is the service layer accessible to communications components, but also the look and feel of the communications components themselves is inherited from the parent platform, without the need for an unsafe executed application.

BRIEF DESCRIPTION OF THE DRAWINGS

FIG. 3a is an illustration of one aspect of a rich internet application component according to one aspect of the innovations herein.

FIG. 3b is an illustration of one aspect of a rich internet application component according to one aspect of the innovations herein.

DETAILED DESCRIPTION OF THE PREFERRED EMBODIMENTS

Reference will now be made in detail to the present innovations, examples of which are illustrated in the accompanying drawings. The implementations set forth in the following description do not represent all implementations consistent with the claimed present innovations. Instead, they are merely some examples consistent with certain aspects related to the present innovations. Wherever possible, the same reference numbers will be used throughout the drawings to refer to the same or like parts.

The present innovations are relevant in the field of online communications applications. Although one embodiment may use live audio and video presentations that have a great deal of interactivity and user control, a live or on-demand stream is not a necessary communications component. Embodiments of the innovations herein may function with or without an audio or video stream depending on the specific implementation. Certain embodiments of the present innovations may be a collection of other pieces of functionality, or communications components that interact and collaborate with each other using a common underlying open platform. Again, this may occur with or without live audio and video elements.

Figure 1:
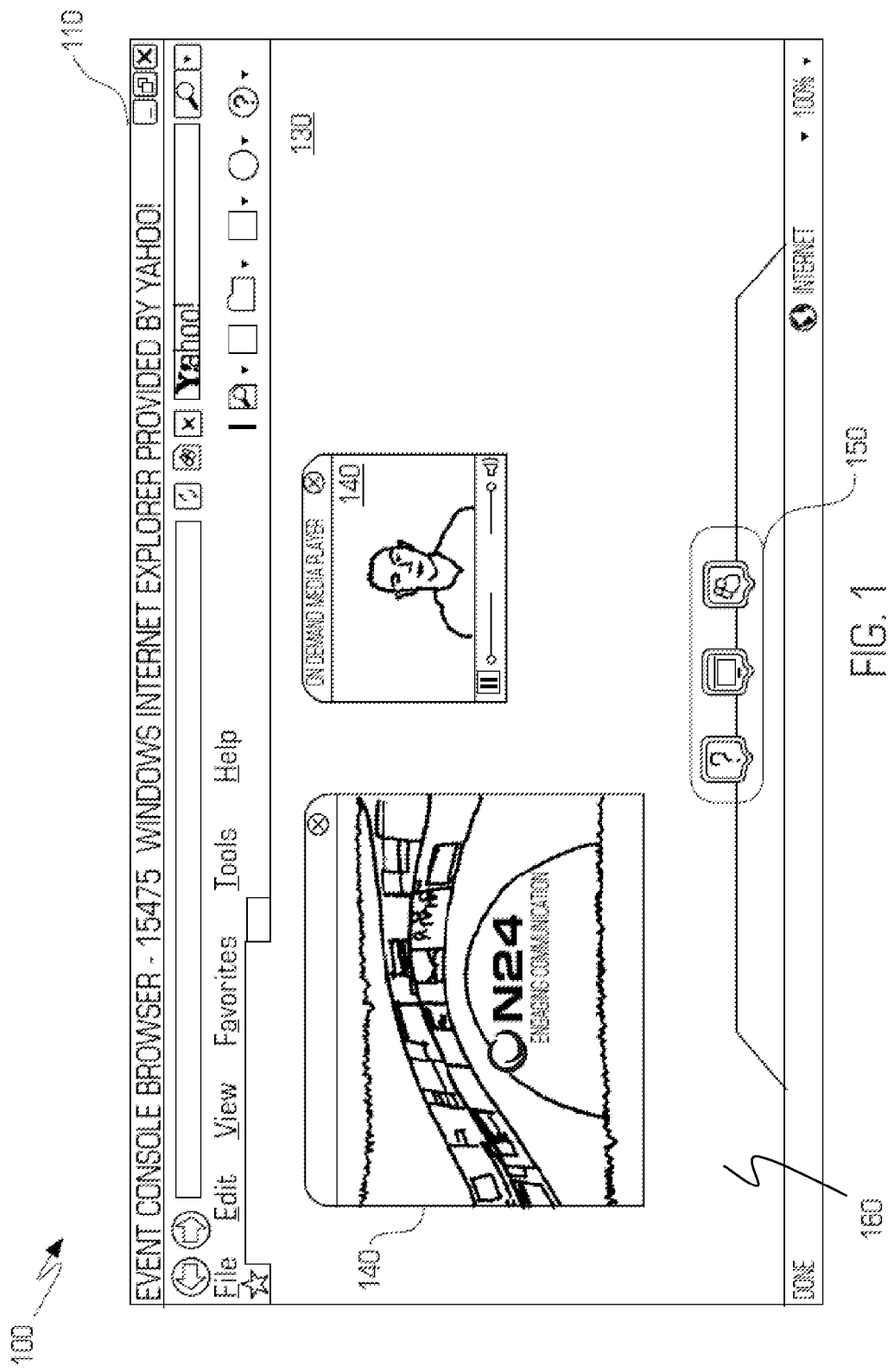
FIG. 1 is an application interface according to one aspect of the innovations herein.

FIG. 1 shows a collection of communication components such as slide communications component 120, media communications component 130, and menu ribbon component 150 which are aggregated into an event console 100. Console 100 may include an unlimited number of components, additionally including components such as display background component 140 and screen background 160. In at least one potential embodiment, event console 100 functions only within the internet browser 110 of a computing system, such as Windows Internet Explorer™. The event console is created within the internet browser 110 using browser plugins in conjunction with a standardized plugin system such as Adobe Flash™ or Microsoft Silverlight™ as an enabler. The plugins are not a required component of this solution, since a fully-browser based version (based on HTML5) is also implemented. This allows console 100 to function in many standardized environments without the need to download and install a desktop application, with the console 100 functioning inside the browser 110, and components 120-150 functioning inside console 100. Additional details related to the structure and function of communication components aggregated within console 100 will be described below.

Figure 2:
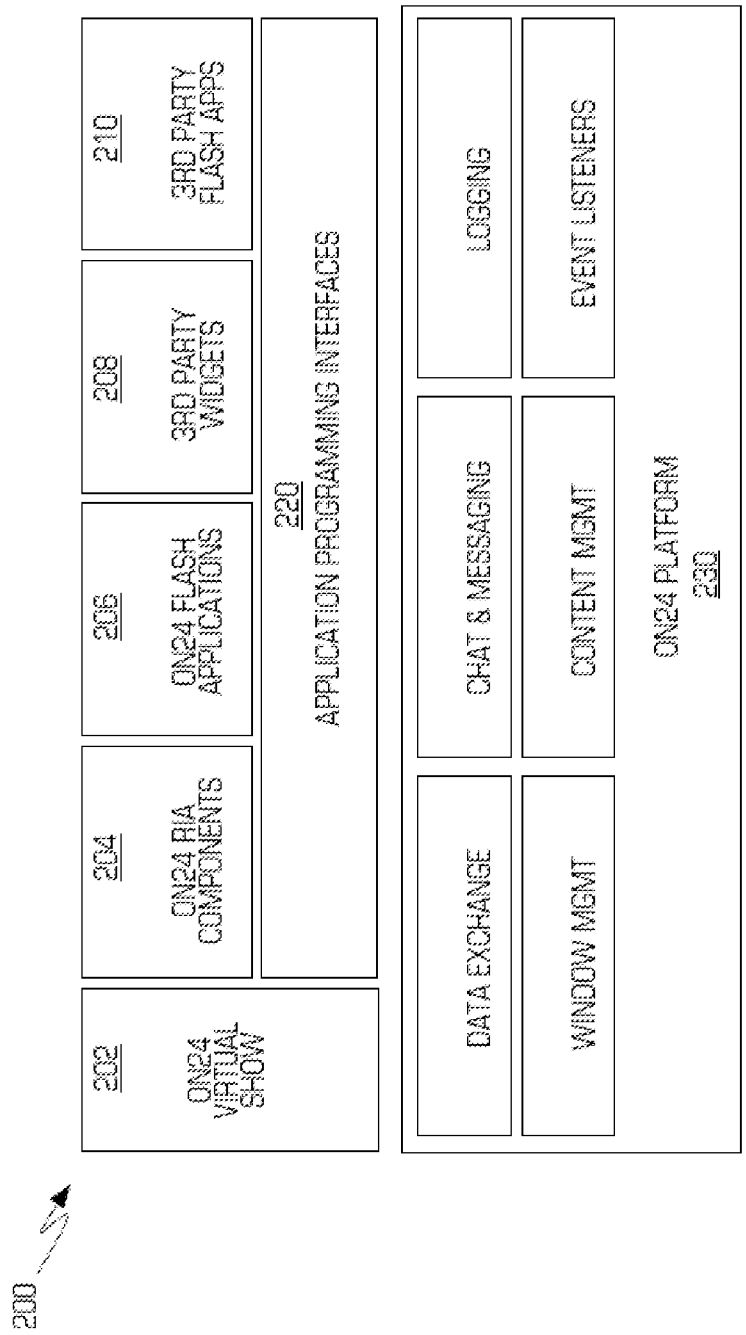
FIG. 2 is an illustration of a communication system according to one aspect of the innovations herein.

FIG. 2 shows a diagram of open console platform 200, including base platform 230. Base platform 230 includes data exchange 232, chat and messaging 234, logging 236, window management 238, content management 240, and event listening 242. Additional details related to base platform 230 are disclosed in U.S. patent application Ser. No. 11/246,033 which is hereby incorporated by reference. Open console platform 200 also includes programming interfaces 220, and in certain embodiments may include, rich internet application (RIA) components 204, flash applications 206, 3rd party components 208, a web application framework components HTML5 components, Silverlight Components, and third party flash applications 210. As described above, some embodiments may include only certain types of components or applications. Each embodiment of the present innovations is not required to include all of RIA components 204, flash applications 206, 3rd party components 208, HTML5 components, Silverlight Components, and third party flash applications 210. Instead, certain embodiments may require only one, multiple, or all of the above applications and components.

Some embodiments of open platform 200 include or are presented in conjunction with a virtual show 202. Virtual show 202 may interface and provide and receive information to and from some or all of the components or applications operating with API 220. Details related to virtual show 202 may be found in U.S. patent application Ser. No. 12/131,849, which is hereby incorporated by reference. As discussed above, open console platform may exist either with or without an associated virtual show.

Programming interfaces 220 in conjunction with base platform 230 provides a foundation for building out sophisticated, domain-specific, user-targeted communications components for delivering the customized, personalized, webcasting experience. By using an open interface, the base platform 230 is made accessible to the widest possible audience, regardless of location, device used to view it, or language. The "open" nature of the platform 200 allows third parties to develop and deploy communications, interactive, and informational components independently. This open platform 200 defines a level of programming interfaces available to webcasting communications components in the base platform 230 such as: window/layer management such as z-index, listing and controlling layers, windows, sizing, positioning, transitions; data providers including particular location, role, resources available to that role in the current location; logging including problems/errors, action/hit-tracking; and interaction with standard functionality such as launching a console like console 100 of FIG. 1, launching URL's, Briefcases survey components or components such as media component 130 or slide component 120 of FIG. 1. The programming interface 220 may also be used to standardize interfaces, both of elements from base platform 230 and components and applications created to use the programming interfaces 220. This may be done to allow a unifying look-and-feel to be applied by default to components developed by disparate sources and third parties who may never interact with each other.

Live or On-Demand Rich Media Internet Applications require complex interactivity between the various parts, or communications components, of the application. At the same time, new communications components or customization of existing communications components which may conflict in a closed system are possible, this requires communication components using programming interface 220 to create new functionality and perform its individual role without concerns of conflicts with other communications components. The communications components may also be integrated into the final presentation in a way that masks their individual and different sources, and shows the appearance of a single unified application despite the different development sources and/or times of various communication components.

The complex interaction within the various components is managed by a central "Communications Manager" object, which registers events or requests from individual components, identifies the priority of each event, and determines the callback mechanism to deliver information back to the calling component. This object then applies a layer of security filters to verify that the calling component has the appropriate permissions to access the resources it is requesting, and that it has not exceeded its quota of requests within a given time frame. Once all these filters are passed and the Communications Manager determines that the event or method being called can in fact be acted on—the event or method is allowed to proceed in a metered and organized way. Registered event listeners, or method calls return the information to the component via a callback method, including the requested information, if any, and status of the original request. In this way, the platform enables the limited resources available on the browser to be allocated with the appropriate priority and rationing so as to allow for a smooth, seamless, and integrated user experience. Contrast this organized platform approach with a mashup of components—each unaware of the other, and each competing for the limited resources available to the browser (CPU, threads, number of concurrent request to the back-end systems available, etc.), degrading performance in unpredictable and undesirable ways.

Figure 3D:
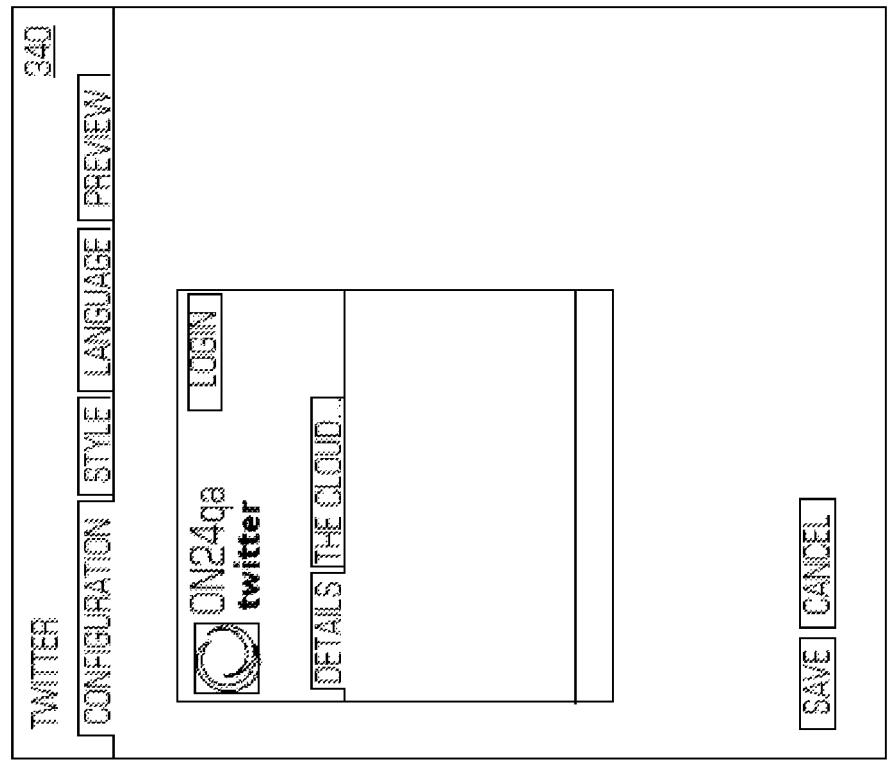
FIG. 3d is an illustration of one aspect of a rich internet application component according to one aspect of the innovations herein.
Figure 3C:
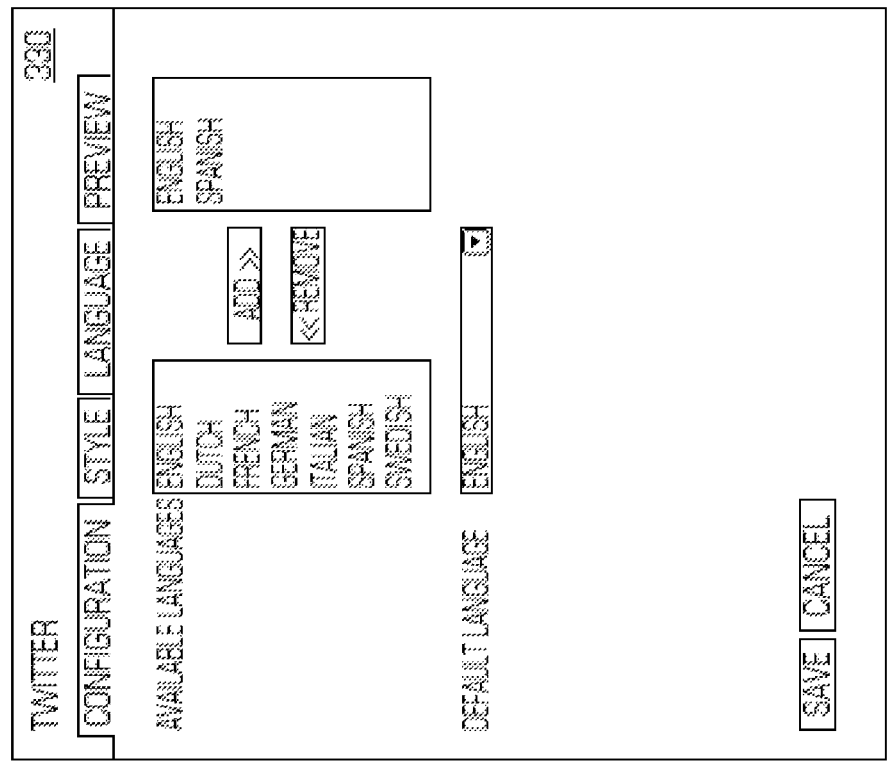
FIG. 3c is an illustration of one aspect of a rich internet application component according to one aspect of the innovations herein.
Figure 3E:
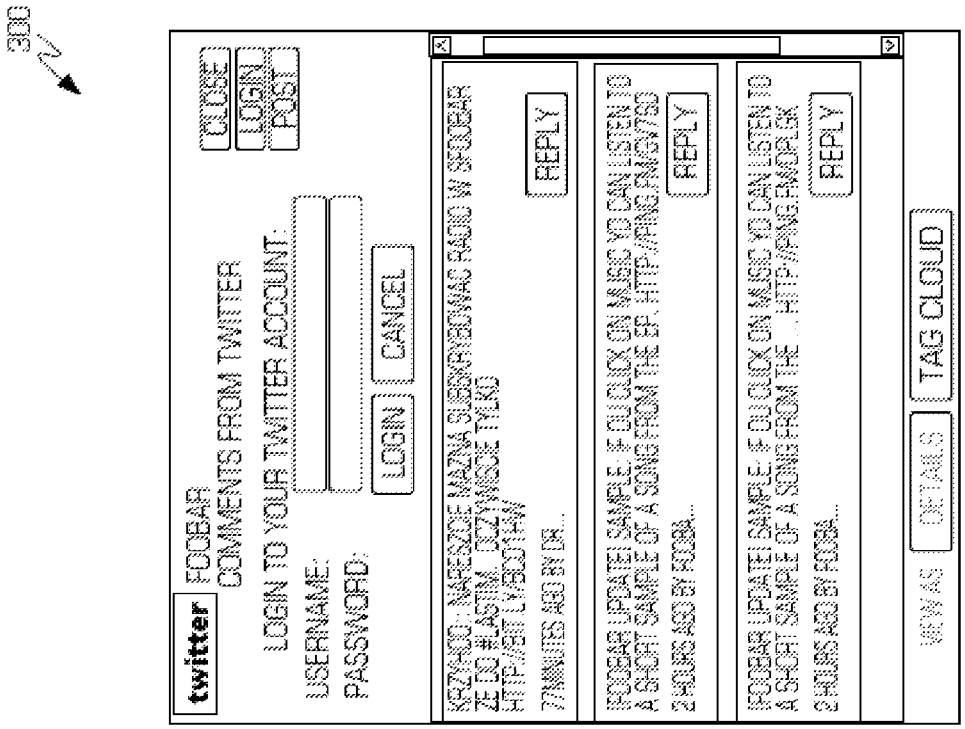
FIG. 3e is an illustration of a rich internet application component according to one aspect of the innovations herein.
Figure 3E:
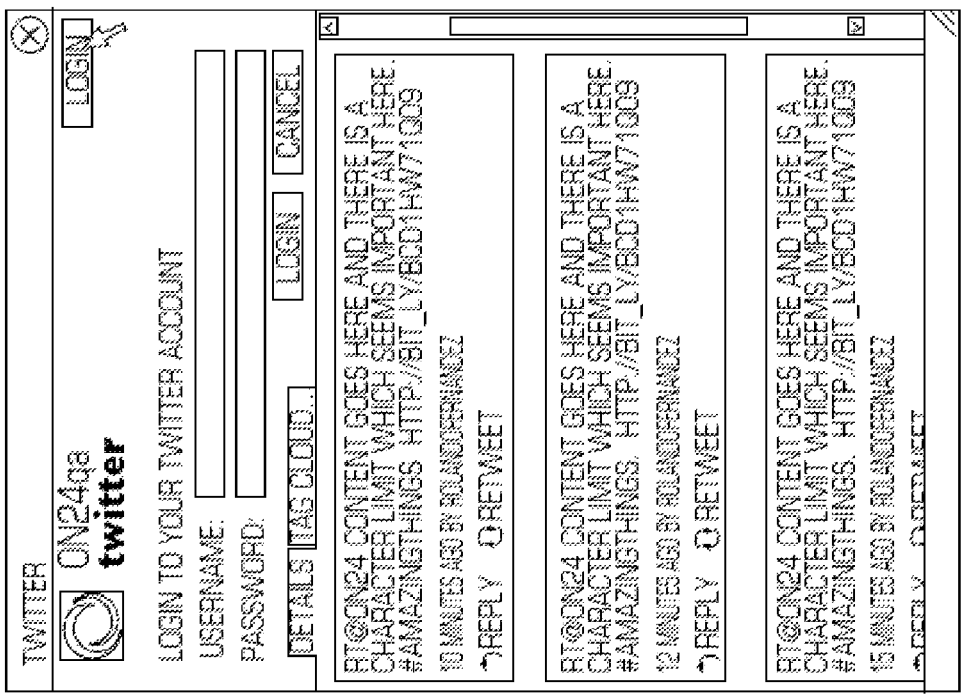

FIGS. 3*a*, 3*b*, 3*c*, and 3*d* show an embodiment of console wrapper definitions which may be used to create and modify a component such as Twitter™ component 300 of FIG. 3*e* which may then be presented in a console such as console 100 of FIG. 1. Components designed to interact with this open platform can meet a nearly unlimited range of application needs, but may share a set of common characteristics by design.

FIG. 3*a* shows a potential configuration interface 310 for configuration of a component using a component container. Components may be self-configuring with interfaces such as interface 310 shown in FIG. 3*a* to allow both initial and subsequent modification of the use of that communications component by the creator of the component, a presenter of a presentation or virtual show, by an audience member that may be viewing the component in a console such as console 100 of FIG. 1. Each component may include different configuration settings and interfaces created to interface with the programming interface 220 of FIG. 2.

FIG. 3*b* shows a skin interface 320. Components may also be skinnable such that the communications components inherit the user-interface styles from the parent applications or overall console skin setting to create a unified presentation, and allow overriding them on a case-by-case basis, as needed as shown by the style settings of skin interface 320.

FIG. 3*c* shows language setting interface 330. Communications components may be designed to support multiple languages, and may interface with the programming interface 220 as part of a component shell to allow adding of new languages at any time to the component.

FIG. 3d shows a preview window 340 as part of the configuration shell for reviewing an interface for a communication component to be included in a console 100. The preview window may allow review and modification of any graphics, animations, or other visible or changing element of a communication console as part of the component shell.

FIG. 3e shows a communication component 300 for presentation and aggregation within a communication console 100. As described above, the communication component is designed to be as flexible and open ended as possible while operating through programming interface 220 so that each communication components may be device agnostic. This functions with programming interface 220 such that such that the communication component is designed to work on any device, computer, mobile phone, PDA, Media Player, that supports the basic platform (HTML5, Adobe Flash™, Microsoft Silverlight™, and etcetera) for Rich internet applications. As shown by Twitter™ component 300 of FIG. 3e, a component may include custom graphics, a login to an external service, and communications to and from an external service as part of the component within communications console 100. Social networking communications components may include the ability to interact in a self-contained way with other users without going to a different web site, loading another page, or leaving a communication console such as communication console 100 in any way. User networking, linking, and chat, such as through Twitter™, Facebook™, or a number of other platform integrations can be accomplished via these sorts of communications components.

Figure 4:
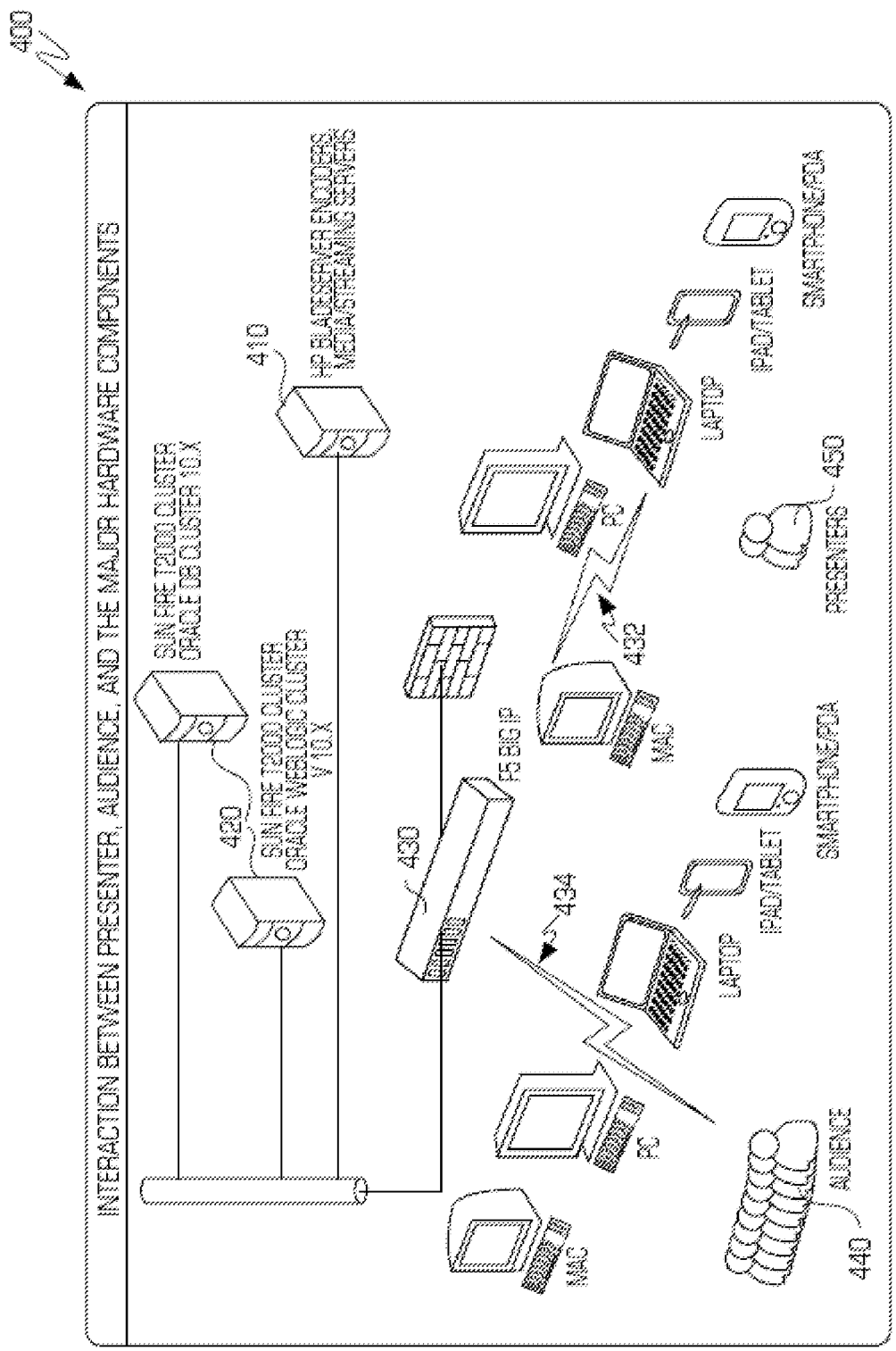
FIG. 4 is an illustration of a communication system according to one aspect of the innovations herein.

FIG. 4 shows communication console system 400 for presenting communication components as part of a communication console to an audience 440. Back end hardware components may include database hardware 420, which, in one example, may be Sun Fire T2000™ Clusters operating Oracle DB Cluster 10.x™. Back end hardware components may additionally include streaming hardware 410 such as HP™ bladeserver encoder and media/streaming servers. The back end hardware components 410 and 420 may be coupled to presenter hardware 432 and audience hardware 434 via networking hardware 430. The back end comprises a data store which may be stored on computers that house a database, or XML files to represent the data, and a middleware used by the application layer to save, retrieve and interact with this data. In the case of a live presentation or virtual show, presenters 450 and audience 440 may be connected to back end hardware at the same time to create a live presentation. Alternatively, for a recorded presentation, show, or other use of console 100, presenters may store communication modules and/or media on database hardware 420 for later use by audience 440.

As discussed above, audience hardware 434 may include any device, computer, mobile phone, PDA, Media Player that supports a basic platform (HTML5, Adobe Flash™, Microsoft Silverlight™, and etcetera) for Rich internet applications.

In one potential embodiment of communication console system 400, database hardware may include a library of communication components for use by presenters 450 with presenter hardware 432. Standard and third party communications components may be included, from which they can be picked and added to a webcast or virtual event. Once added, these communications components bring with them the interfaces to configure the properties needed by the communications component to function within the specified context.

Figure 5:
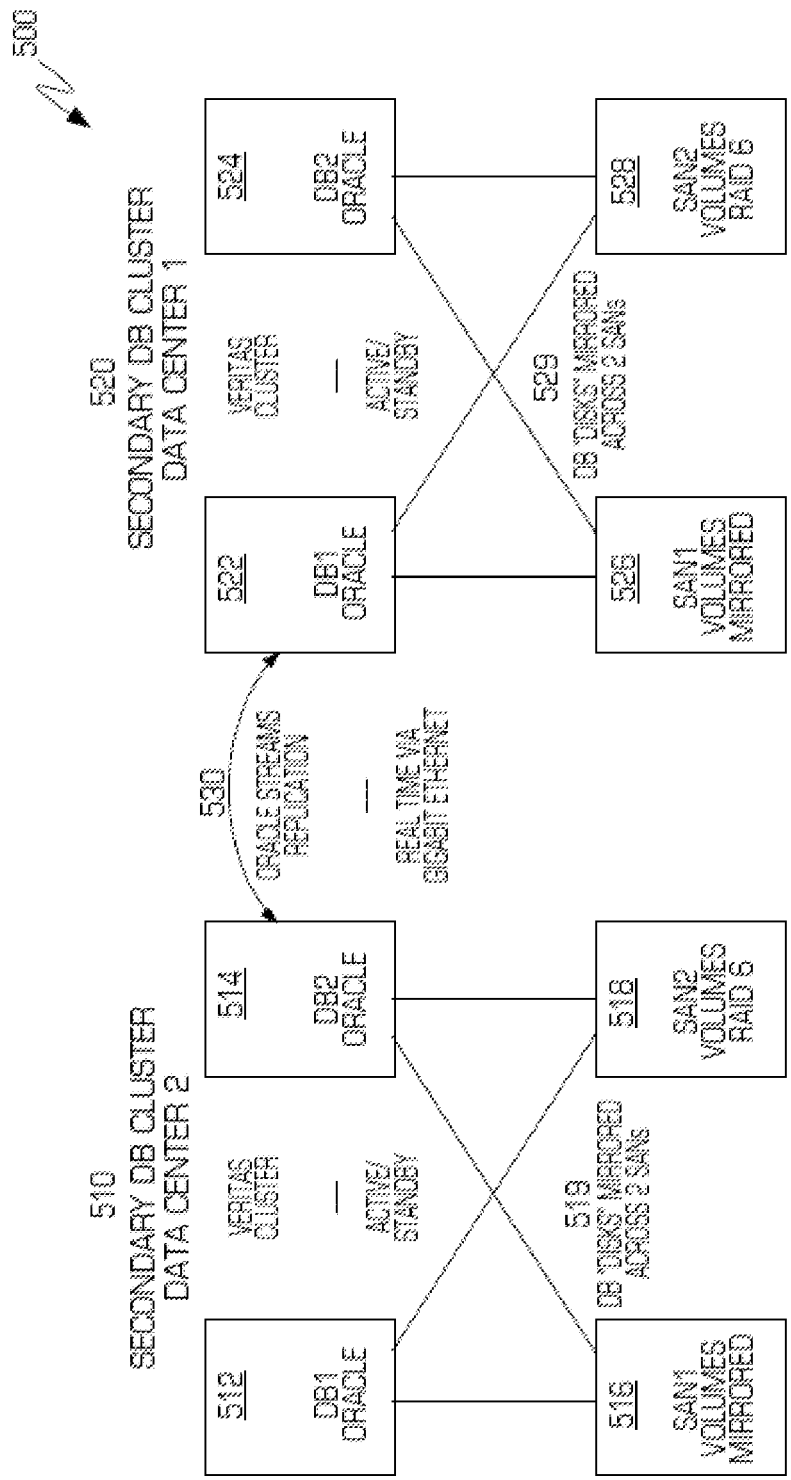
FIG. 5 is a diagram of a database for use with a communication console system according to one aspect of the innovations herein.

FIG. 5 shows data system 500 which may include database hardware such as database hardware 420 in one potential implementation. Data system 500 includes a primary data center 520 and a secondary data center 510. The first and second data centers may contain first databases (512 and 522 respectively) and second databases (514 and 524 respectively), with the data from each data center stored in first storage area networks (516 and 526 respectively) and second storage area networks (518 and 528 respectively). The data centers may be communicatively coupled by a communication link 530.

Figure 6:
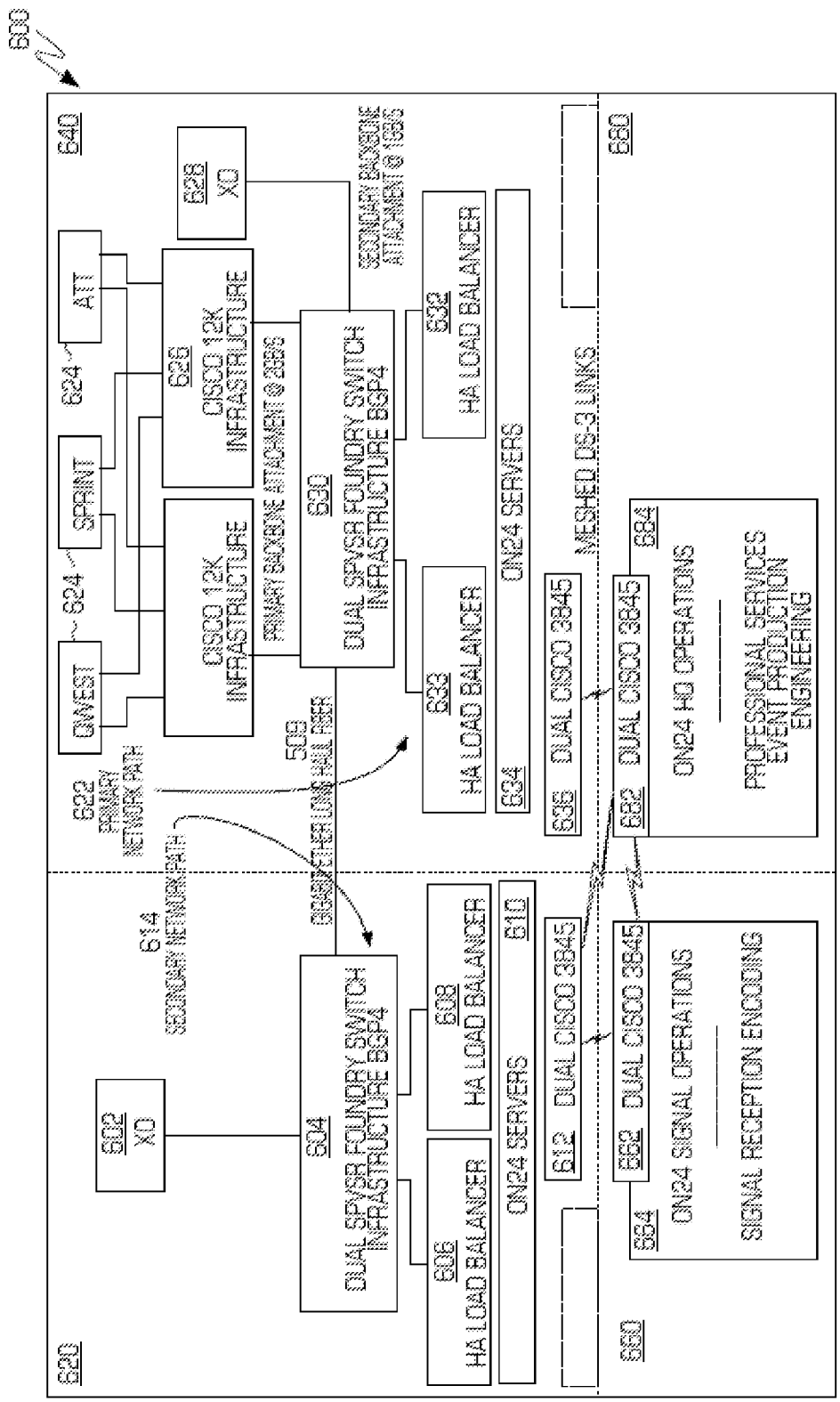
FIG. 6 is a diagram of a communication console system according to one aspect of the innovations herein.

FIG. 6 shows an alternate embodiment of a communication console system in the form of communication console system 600. Communication console system 600 may optionally be distributed such that the components are divided into different locations such as first location 620, second location 640, third location 660, and fourth location 680. Communication console system 600 may include network paths 624 from internet service providers to network infrastructure 626, and then to switch infrastructure 630. Network traffic may be divided or routed between a primary network path 622 and a secondary network path 614. The primary network path 622 interfaces with hardware 634 at second location 640 via switch infrastructure 630 which uses load balancers 632 and 633. The secondary network path may be connected to switch infrastructure 630 via communication link 609. Link 609 may be coupled to switch infrastructure 604 which uses load balancers 606 and 608 to allow network traffic to access hardware 610. Additionally a first secondary attachment 628 may allow traffic into the system via switch infrastructure 630, and a second secondary attachment may allow network traffic into the system via switch infrastructure 604. Finally, hardware 610 and hardware 634 may communicate with service hardware 684 and signal hardware 664 by use of networking hardware 612, 636, 682, and 662, respectively, which provide communication links between first location 620, second location 640, third location 660, and fourth location 680.

With regard to computing components and software embodying the innovations herein, aspects of the innovations herein may be implemented and/or operated consistent with numerous general purpose or special purpose computing system environments or configurations. Various exemplary computing systems, environments, and/or configurations that may be suitable for use with the innovations herein may include, but are not limited to, personal computers, servers or server computing devices such as routing/connectivity components, hand-held or laptop devices, multiprocessor systems, microprocessor-based systems, set top boxes, smart phones, consumer electronic devices, network PCs, other existing computer platforms, distributed computing environments that include one or more of the above systems or devices, etc.

The innovations herein may be described in the general context of computer-executable instructions, such as program modules, being executed by a computer, computing component, etc. In general, program modules may include routines, programs, objects, components, data structures, and such that perform particular tasks or implement particular abstract data types. The innovations herein may also be practiced in distributed computing environments where tasks are performed by remote processing devices that are linked through a communications network. In a distributed computing environment, program modules may be located in both local and remote computer storage media including memory storage devices.

The above computing components and environments may also include one or more type of computer readable media.

Computer readable media can be any available media that is resident on, associable with, or can be accessed by computing components or environments discussed above. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed. Communication media may comprise computer readable instructions, data structures, program modules or other data embodying the functionality herein. Further, communication media may include wired media such as a wired network or direct-wired connection, and wireless media such as acoustic, radio frequency/RF, infrared and other wireless media. Combinations of the any of the above are also included within the scope of computer readable media.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions such as single instruction multiple data (SIMD) instructions, field programmable logic arrays or any mix thereof which provides the desired level performance and cost.

As disclosed herein, implementations and features of the innovations herein may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the innovations herein or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the innovations herein, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain exemplary implementations of the present innovations have been specifically described herein, it will be apparent to those skilled in the art to which the innovations herein pertains that variations and modifications of the various implementations shown and described herein may be made without departing from the spirit and scope of innovations consistent with this disclosure. Accordingly, it is intended that the innovations be limited only to the extent required by the appended claims and the applicable rules of law.

We claim:

1. A method for creating a communication console with aggregated components, said method comprising:

receiving a communications manager object at a computing device, wherein the computing device comprises an application framework capable of running the communication manager object;

executing the communication manager object within the application framework without executing any portion of the communications manager object outside of the application framework;

receiving a first and second communications components at the computing device, and executing the communications components within the application framework to present a presentation to a user;

registering a first request from the first communications component with the communications manager object in which the communications manager object and the first communications component exchange data;

registering a second request from the second communications component with the communications manager object in which the communications manager object and the second communications component exchange data;

identifying, by the communications manager object, a priority for the first request and the second request;

verifying, by the communications manager object, access permissions for the first request and the second request; and metering access, using the communications manager object, to the application framework by the first and second communications component.

2. The method of claim 1 wherein receiving the first and the second communications components further comprises registering the first and second communications components with a registration module of the communications manager object.

3. The method of claim 2 wherein the registration module of the communications manager object includes an open format for registering an unlimited number of modules.

4. The method of claim 1 further comprising creating a user interface from user interface information contained in the first communications component for display as part of the communications console.

5. The method of claim 4 further comprising modifying the user interface using user interface information contained in the second communications component.

6. The method of claim 5 further comprising adjusting the user interface using standardization settings from the communications manager object to standardize the user interface information from the second communications component and the user interface information from the first communications component.

* * * * *